Jan. 3, 1956 J. F. HARMS 2,729,340
DRAIN AND EMULSION PRESERVING ARRANGEMENT FOR CLARIFIERS
Filed Dec. 28, 1950 2 Sheets-Sheet 1
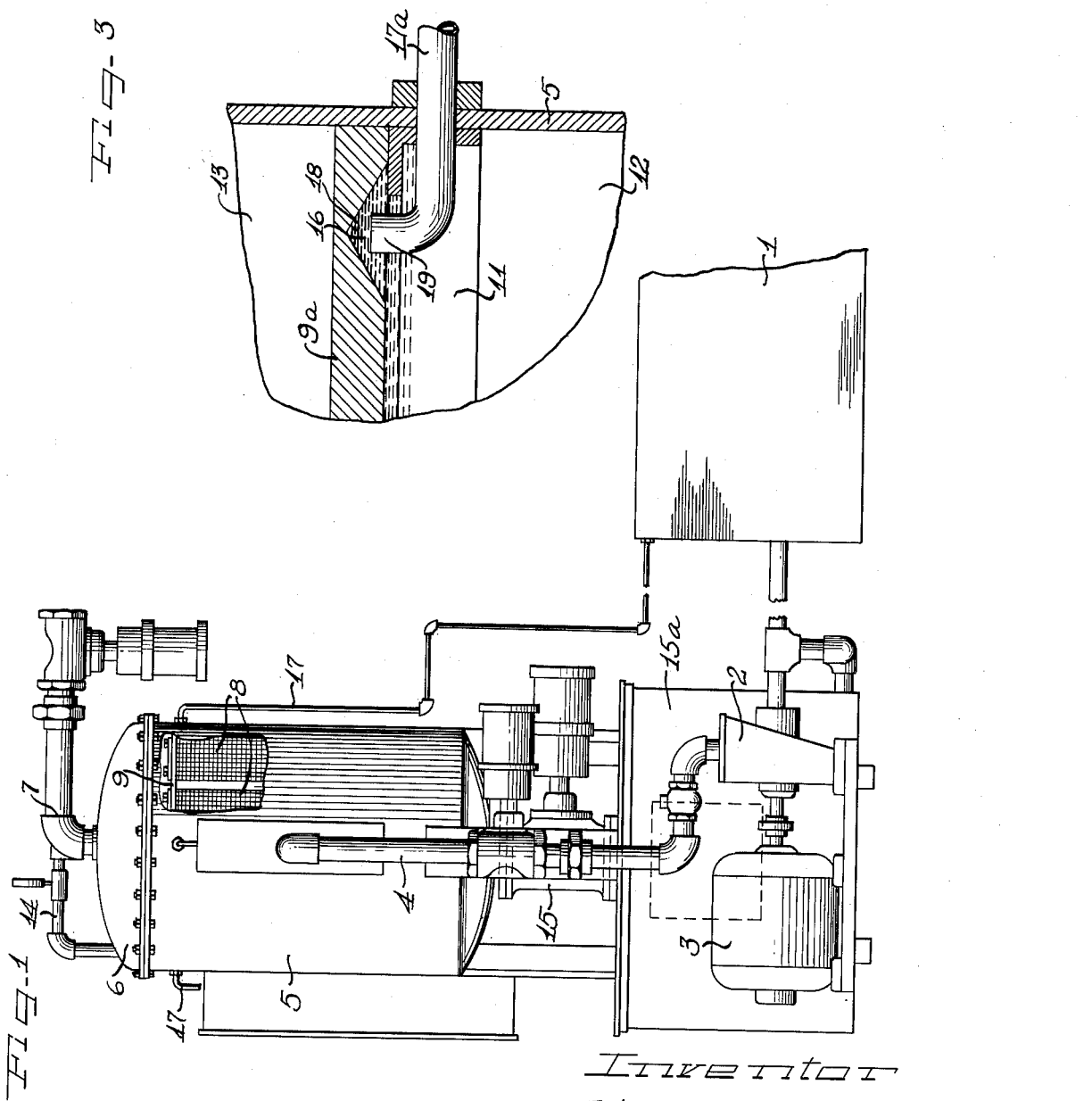
Inventor
John F. Harms Jan. 3, 1956  J. F. HARMS  2,729,340
DRAIN AND EMULSION PRESERVING ARRANGEMENT FOR CLARIFIERS
Filed Dec. 28, 1950  2 Sheets-Sheet 2
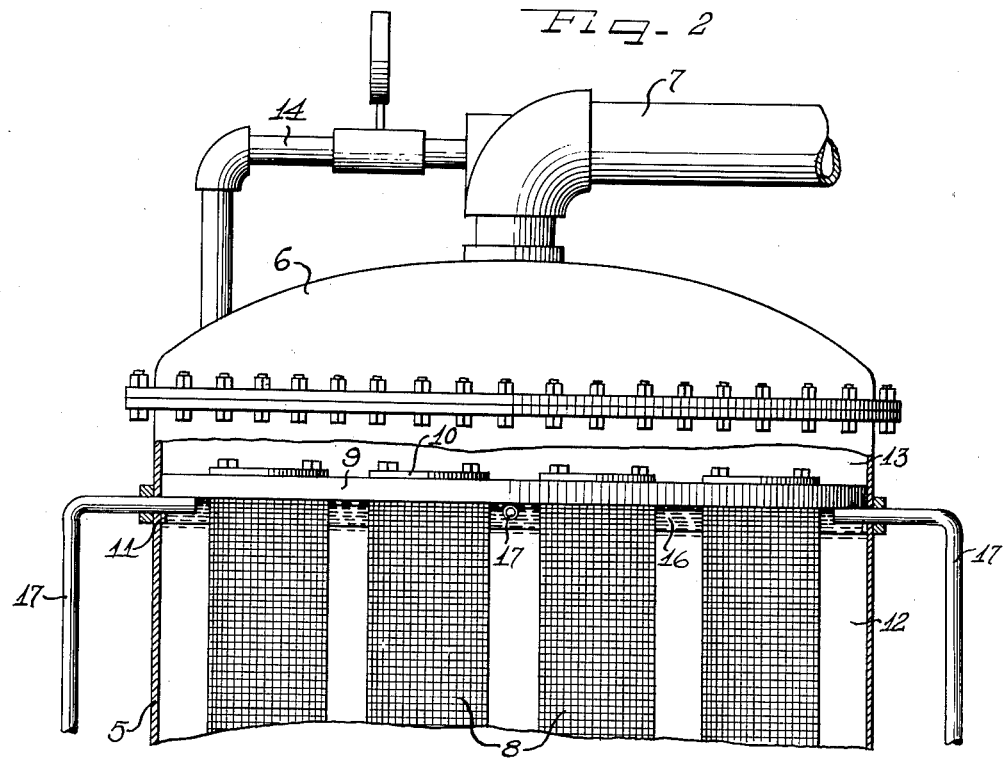
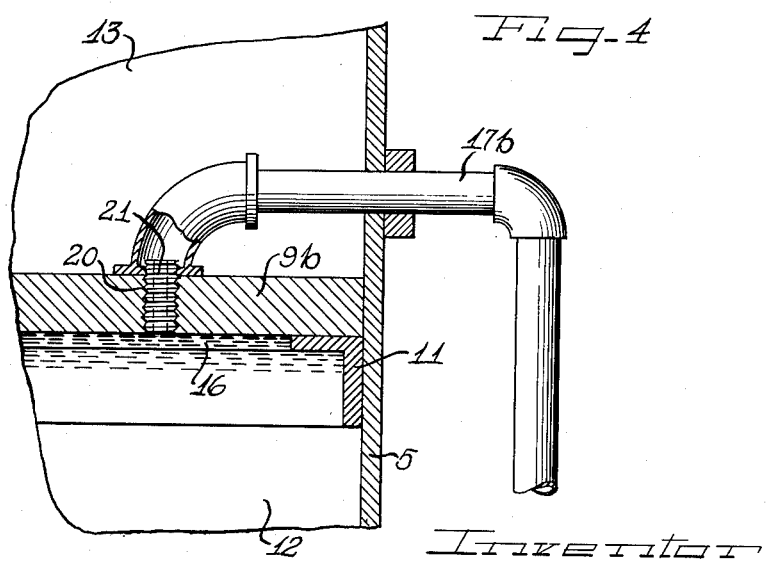
Inventor
John F. Harms

United States Patent Office 2,729,340
Patented Jan. 3, 1956

2,729,340

DRAIN AND EMULSION PRESERVING ARRANGEMENT FOR CLARIFIERS

John F. Harms, Dearborn, Mich., assignor to Houdaille-Hershey of Indiana, Inc., a corporation of Indiana Application December 28, 1950, Serial No. 203,147

5 Claims. (Cl. 210—184)

This invention relates to improvements in a drain arrangement for clarifiers, the invention being highly desirable for use in connection with the clarification or purification of coolants used with cutting and grinding machines, although the invention may be used with other types of emulsions, as will be more apparent to one skilled in the art.

In the past, many and various types of clarifiers or purification devices have been developed, but when emulsions were purified especially in clarifiers of relatively large capacity, difficulty was frequently experienced in that some ingredient would separate from the emulsion during the filtering process, and thereafter the emulsion would not contain the proper amount of the respective components. By way of specific example, in the clarification of coolants of the character used in connection with cutting and grinding tools, which coolants frequently embody a soluble oil carried in an aqueous solution, the soluble oil would separate from the emulsion, and thereafter the coolants would not contain the proper amount of oil.

With the foregoing in mind, it is an important object of the instant invention to provide clarifying apparatus embodying a drain arrangement whereby an ingredient separated from an emulsion being clarified will be immediately drained off and returned to be mixed with the contaminated emulsion, so that the emulsion during its travel from the source of use through the clarifying equipment and back to the source of use will always contain the proper mixture of ingredients.

Another object of this invention resides in the provision of a clarifier for emulsions embodying drain means located in a judicious location in the filtering part of the clarifier to constantly drain off any ingredients separating from the remainder of the emulsion.

It is also an object of this invention to provide emulsion clarification apparatus embodying a tank in which a contaminated emulsion is filtered under pressure, and wherein one or more relatively low capacity drain pipes terminate open ended adjacent an end of the filtering portion of the tank to drain off an ingredient separated from the emulsion, the pressure on the contaminated emulsion forcing the separated ingredient to pass through the drain means.

A further feature of this invention resides in the provision of clarifying apparatus for an emulsion, wherein there is a filter chamber for contaminated emulsion, and drain means communicating with the uppermost part of the filter chamber to constantly drain off any supernatant layer of an ingredient separated from the emulsion.

Still a further object of the invention resides in the provision of a method of clarifying and preserving an emulsion including the steps of delivering contaminated emulsion from a source of use to a reservoir, flowing the emulsion from the reservoir through filtering means, and flowing the filtrate back to the source of use, while contemporaneously with the filtering operation draining off any separated emulsion ingredient and returning that drained off ingredient to the reservoir for remixing in the emulsion.

While some of the more salient features, characteristics and advantages of the instant invention have been above pointed out, others will become apparent from the following disclosures, taken in conjunction with the accompanying drawings, in which—

Figure 1 is a fragmentary side elevational view of clarifying apparatus equipped with a drain arrangement, embodying principles of the instant invention, with parts broken away to disclose interior structure;

Figure 2 is an enlarged fragmentary part sectional, part elevational view of the upper portion of the structure of Fig. 1;

Figure 3 is a fragmentary enlargement of the structure at the right central portion of Fig. 2, but showing a drain arrangement of slightly different form; and Figure 4 is a fragmentary part sectional, part elevational view of the same character as Fig. 3, but showing a still different form of drain arrangement.

As shown on the drawings:

For purposes of clarity and by way of illustration only, the instant invention will be described in connection with the purification of a coolant for cutting and grinding machines, which coolant is an emulsion including a soluble oil in an aqueous solution. With reference to Fig. 1, it will be seen that in the illustrated embodiment of the invention there is a reservoir 1 for contaminated coolant. The contaminated coolant is pumped under pressure by means of a pump 2, actuated by any suitable power unit such as a motor 3, through a pipe line 4 into a tank 5. This tank is provided with a cover 6 and an outlet pipe line 7 for filtrate. The pipeline 7 leads to the source of use of the emulsion or coolant, such as cutting and grinding machines, and after passing through the machines, the then contaminated coolant, carrying metallic filings, powder, chips and the like from cutting and grinding machines, is returned by means not shown in the drawings to the reservoir 1.

Inside the tank 5 is a plurality of tubular filter screens 8 depending from a filter holding plate 9 by means of a collar flange 10 on the top of each tubular screen. The filter holding plate 9 is supported in position by an annular angle flange 11 welded or equivalently secured to the inside of the tank, as more particularly seen in Fig. 2. It will be noted that the filter holding plate 9 divides the interior of the tank, including the cover, in two compartments or chambers, namely a filtering chamber 12 and a filtrate chamber 13 with which the outlet pipe 7 communicates. The contaminated emulsion introduced into the filter chamber 12 under pressure through the pipe line 4 passes laterally or radially through the tubular filter screens, and the filtrate exits through the upper end of the screens into the chamber 13.

With apparatus of this character, periodically the inflow of contaminated emulsion through the pipe line 4 is cut off, and reverse pressure, such as pneumatic pressure from any suitable source through a pipe line 14 communicating at the exit point with the pipe line 7 is applied in the top of the tank over the filtrate collected in the chamber 13. This filtrate or contaminant free emulsion is then blown in reverse direction through the tubular filter screen assemblies 8, thus cleansing the external surface of the filter screens, and the entire contents of the tank are forced downwardly through a pipe 15, Fig. 1, into a so-called blowdown tank 15a which communicates with the reservoir 1. Any suitable means may be employed to cut off the inflow of contaminated emulsion, close a valve at the filtrate pipe 7, and apply the pneumatic pressure at proper intervals.

With reference now to Fig. 2, it will be noted that with a common form of coolant, an emulsion of soluble oil and an aqueous solution, for cutting or grinding machines, in many cases a supernatant layer 16 of soluble oil will separate from the emulsion and collect against the underside of the screen holding plate 9 at the top of the filtering chamber 12. The filtering chamber is full of liquid during operation and, most frequently, the filter elements or screens will first become clogged adjacent the plate 9. Therefore, in effect, some liquid becomes trapped adjacent the underside of the plate and after some operation, and before backwashing time, the supernatant layer 16 separates and floats on the heavier liquid. Were that separated oil not returned to the main body of the emulsion and again mixed with it, the emulsion would not be of the proper original mixture. Accordingly, one or more drain pipes enter the tank 5 and terminate in an open end immediately adjacent the underface of the plate 9. As seen in Fig. 1, each drain pipe is connected to the reservoir 1 so that any drained off ingredient is promptly returned to the contaminated emulsion reservoir and remixed into the body of emulsion. Owing to the fact that the contaminated emulsion is introduced into the filtering chamber 12 under pressure, no means are necessary outside that pressure to cause a flow of the supernatant layer 16 of soluble oil through the pipe or pipes 17 back to the reservoir 1.

In Fig. 3 I have illustrated a somewhat different form of drain arrangement, and in this instance a filter supporting plate 9a is provided which has a recess 18 in the underface thereof. This recess may be in the form of a complete annular groove, or there may be a circular recess adjacent each drain pipe 17a. Any supernatant ingredient separated from the emulsion will of course assume a position inside the recess 18. It will be especially noted that the inner end 19 of the drain pipe line 17a is curled upwardly inside the inner portion of the recess, so that it is impossible for any supernatant liquid to assume a position inaccessible to the open end of the drain pipe line. To this extent, the structure of Fig. 3 functions slightly more efficiently than the structure of Fig. 2, wherein supernatant liquid to the thickness of the pipe wall in the pipe line 17 might not be drained off.

In Fig. 4, I have shown still another form of drain pipe arrangement wherein a filter screen supporting plate 9b is provided with a threaded aperture 20 therethrough. In this instance, the drain pipe line 17b enters the tank 5 above the plate 9b and the inner portion of the pipe line is turned downwardly, and embodies a hollow nipple 21 threaded through the opening in the plate 9b to terminate immediately adjacent the underface of the plate 9b. The pressure in the filtering chamber 12 is sufficient to force the supernatant liquid layer 16 upwardly through the nipple 21 and remainder of the pipe line 17b.

It is believed that my new and novel method of clarifying and preserving an emulsion is apparent from the foregoing sufficiently to warrant no further description herein.

From the foregoing, it is apparent that I have provided a clarifying apparatus equipped with novel drain means to restore any ingredient separated from an emulsion back into the main body of emulsion so as to preserve the proper mixture of emulsion. Should the separated ingredients be heavier than the rest of the emulsion, it would be a simple expedient to terminate the drain pipe line adjacent the lower end of the tank 5 rather than at the top of the filtering chamber. It will also be noted that the draining arrangement is such as to warrant merely certain pipe line connections, no additional pumping or mechanical force being necessary in order to effect the proper drainage.

It will be understood that modifications and variations may be effected without departing from the scope of the novel concepts of the present invention.

I claim as my invention:

1. In apparatus for clarifying an emulsion, a tank, a filter supporting plate separating the tank interiorly into separate filtering and filtrate compartments, filtering means connected to said plate and arranged to discharge filtrate through said plate into the filtrate compartment, said tank having an intake opening for filtrable emulsion, and an open-ended drain pipe extending through the tank and terminating immediately adjacent the filter compartment side of said plate to drain off a separated portion of an emulsion ingredient from the filtering side of said plate and return the same to the unfiltered emulsion.

2. In apparatus for clarifying an emulsion, a tank, a filter supporting plate separating the tank interiorly into separate filtering and filtrate compartments, filtering means connected to said plate and arranged to discharge filtrate through said plate into the filtrate compartment, said tank having an intake opening for filtrable emulsion, said plate having a recess in the filter compartment side thereof, and a drain pipe extending through said tank and terminating in an open end disposed in said recess to drain off a separated portion of an emulsion ingredient and return the same to the main body of emulsion to maintain the emulsion of the proper mixture.

3. In apparatus for clarifying an emulsion, a tank, a filter supporting plate separating the tank interiorly into separate filtering and filtrate compartments, filtering means connected to said plate and arranged to discharge filtrate through said plate into the filtrate compartment, said tank having an intake opening for filtrable emulsion, and a drain pipe extending into the filtrate compartment and through said plate to the filter compartment side thereof to drain off a separated portion of an emulsion ingredient from the filtering compartment side of said plate and return the same to the main body of emulsion.

4. In apparatus for clarifying an emulsion, a tank, a filter supporting plate separating the tank interiorly into separate filtering and filtrate compartments, filtering means connected to said plate and arranged to discharge filtrate through said plate into the filtrate compartment, said tank having an intake opening for filtrable emulsion, and a plurality of open-ended drain pipes entering said tank and terminating immediately adjacent the filter compartment side of said plate to drain off a separated portion of an emulsion ingredient and return the same to the main body of emulsion.

5. In apparatus for clarifying and preserving an emulsion, a tank, a transverse plate having openings therein and separating said tank interiorly into a filtrate chamber above said plate and a filtering chamber below said plate, a filter element depending from said plate over each opening therein to discharge filtrate through the respective opening into said filtrate chamber, said tank having an intake opening into said filtering chamber for contaminated emulsion and an opening from said filtrate chamber for the discharge of filtered emulsion, and a drain pipe extending through said tank and terminating in an open end adjacent the underside of said plate to drain off a separated part of the emulsion and return that part to the contaminated emulsion.

References Cited in the file of this patent

UNITED STATES PATENTS

| Number | Name | Date |
| --- | --- | --- |
| 1,328,044 | Hills | Jan. 13, 1920 |
| 1,469,026 | Silvester | Sept. 25, 1923 |
| 1,524,916 | Demme | Feb. 3, 1925 |
| 1,547,712 | Zoul | July 28, 1925 |
| 1,743,466 | Maag et al. | Jan. 14, 1930 |
| 1,876,243 | Kelly | Sept. 6, 1932 |
| 2,348,167 | Erwin | May 2, 1944 |
| 2,405,838 | Lawson et al. | Aug. 13, 1946 |
| 2,423,329 | Le Clair | July 1, 1947 |
| 2,496,370 | Bailey | Feb. 7, 1950 |
| 2,562,730 | Miller, Jr. | July 31, 1951 |
| 2,578,040 | Booth et al. | Dec. 11, 1951 |